United States Patent
Garg

(10) Patent No.: US 10,885,452 B1
(45) Date of Patent: Jan. 5, 2021

(54) RELATION GRAPH OPTIMIZATION USING INCONSISTENT CYCLE DETECTION

(71) Applicant: Amazon Technologies, Inc., Seattle, WA (US)

(72) Inventor: Nikhil Garg, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 835 days.

(21) Appl. No.: 15/193,883

(22) Filed: Jun. 27, 2016

(51) Int. Cl.
G06N 7/00 (2006.01)
G06N 5/04 (2006.01)
G06F 16/93 (2019.01)
G06F 16/901 (2019.01)

(52) U.S. Cl.
CPC ........ *G06N 7/005* (2013.01); *G06F 16/9024* (2019.01); *G06F 16/93* (2019.01); *G06N 5/046* (2013.01)

(58) Field of Classification Search
CPC ..... G06F 16/9024; G06F 16/93; G06N 7/005; G06N 5/046
See application file for complete search history.

(56) References Cited

U.S. PATENT DOCUMENTS

| | | | |
|---|---|---|---|
| 7,246,118 B2 | 7/2007 | Chastain et al. | |
| 8,700,987 B2 | 4/2014 | Spalink | |
| 2003/0065632 A1* | 4/2003 | Hubey | G06N 3/0436 706/15 |
| 2006/0053151 A1* | 3/2006 | Gardner | G06F 17/279 |
| 2007/0203870 A1* | 8/2007 | Saito | G06F 17/10 706/52 |
| 2012/0005616 A1* | 1/2012 | Walsh | G06F 16/34 715/776 |
| 2014/0082022 A1* | 3/2014 | Lamba | G06F 16/9027 707/777 |
| 2014/0303962 A1* | 10/2014 | Minca | G06F 17/2785 704/9 |
| 2015/0363476 A1* | 12/2015 | Li | G06F 16/258 707/714 |
| 2016/0337295 A1* | 11/2016 | Bennett | H04L 51/18 |
| 2017/0011037 A1* | 1/2017 | Qian | G06F 16/9535 |
| 2017/0337262 A1* | 11/2017 | Smith | G06F 16/36 |

OTHER PUBLICATIONS

David K. Elson, et al., "Extracting Social Networks from Literary Fiction", Proceedings of the 48th Annual Meeting of the Association for Computational Linguistics, 2010, pp. 138-147.

(Continued)

*Primary Examiner* — Alan Chen
(74) *Attorney, Agent, or Firm* — Robert C. Kowert; Kowert, Hood, Munyon, Rankin & Goetzel, P.C.

(57) ABSTRACT

A first graph is generated from a text data set, with graph nodes representing named entities in the data set and edges representing relationships between the named entities, and with edge weights indicating confidence levels. At least one cycle of the graph may be designated as inconsistent using a rule set. An edge may be selected for deletion from the first graph based on its presence in an inconsistent cycle, the cycle's weight, and/or on the edge weight. A representation of relationships indicated in the modified graph is provided programmatically.

21 Claims, 10 Drawing Sheets

(56) References Cited

OTHER PUBLICATIONS

Aron Culotta, et al., "Dependency tree kernels for relation extraction." Proceedings of the 42nd Annual Meeting on Association for Computational Linguistics. 2004, pp. 1-7.

Cicero Nogueira Dos Santos, et al., "Classifying Relations by Ranking with Convolutional Neural Networks", In Proceeding of the 53rd Annual Meetings fo the Association for Computational Linguistics and the 7th International Joint Conference on Natural Language Processing, Jul. 26-31, 2015, pp. 626-634.

Julia Efremova, et al., "Towards population reconstruction: extraction of family relationships from historical documents", In the First International Workshop n Population Informatics for Big Data (PopInfo '15), Aug. 10, 2015, pp. 1-9.

David K. Elson, et al., "Automatic Attribution of Quoted Speech in Literary Narrative", In Association for the Advancement of Artificial Intelligence, 2010, pp. 1-7.

Iris Hendrickx, et al., "SemEval-2010 Task 8: Multi-Way Classification of Semantic Relations Between Pairs of Nominals", In the Proceedings of the NAACH HLT Workshop on Semantic Evaluations: Recent Achievements and Future Directions, Jun. 2009, pp. 94-99.

Alexander T. Ihler, et al., "Loopy Belief Propagation: Convergence and Effects of Message Errors", Journal of Machine Learning Research 6, 2005, pp. 905-936.

Nanda Kambhatla, "Combining Lexical, Syntactic, and Semantic Features with Maximum Entropy Models for Extracting Relations", Proceedings of the ACL 2004 on Interactive Poster and Demonstration Sessions, Association of Computational Linguistics, 2004, pp. 1-4.

Dimitrios Kokkinakis, et al., "Character Profiling in 19th Century Fiction", Proceedings of Language Technologies for Digital Humanities and Cultural Heritage Workshop, Sep. 16, 2011, pp. 70-77.

Huma Lodhi, et al., "Text Classification using String Kernels", Journal of Machine Learning Research 2, 2002, pp. 419-444.

Amazon Web Services, "Amazon Machine Learning Developer Guide Version Latest", API Version Apr. 9, 2015, pp. 1-141.

Aibek Makazhanov, et al., "Extracting Family Relationship Networks from Novels", arXiv:1405.0603v1, May 3, 2014, pp. 1-8.

Daniel Santos, et al., "Extraction of Family Relations between Entities", In the Proceedings of the INForum, 2010, pp. 549-560.

Richard Socher, et al., "Semantic Compositionality through Recursive Matrix-Vector Spaces", Proceedings of the 2012 Joint Conference on Empirical Methods in Natural Language Processing and Computational Natural Language Learning, Association for Computational Lignuidtics, 2012, pp. 1201-1211.

Dimitry Zelenko, et al., "Kernel Methods for Relation Extraction", Journal of Machine Learning Research 3, 2003, pp. 1083-1106.

Zhou, Guo Dong; et al., "Exploring Various Knowledge in Relation Extraction", Proceedings of the 43rd Annual meeting of the ACL, Association for Computational Linguistics, 2005, pp. 427-434.

* cited by examiner

| Relationship category examples 260 | | |
|---|---|---|
| Domain | Category name | Directed? |
| Family | Is sibling of | No |
| | Is parent of | Yes |
| | Is grandparent of | Yes |
| | Is child of | Yes |
| | Is grandchild of | Yes |
| | Is nephew/niece of | Yes |
| | Is aunt/uncle of | Yes |
| | Is spouse of | No |
| | Is cousin of | No |
| | Is step-relative of | No |
| | ... | |
| Workplace | Reports directly to | Yes |
| | Reports indirectly to | Yes |
| | Has a more senior title than | Yes |
| | Is in the same department as | No |
| | Works in the same location as | No |
| | ... | |
| Social media | Is directly linked to | No |
| | Is indirectly linked to | No |
| | Has sent messages to | Yes |
| | Shares an interest in | No |
| | ... | |

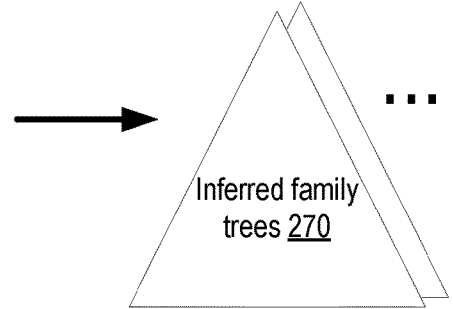

Inferred family trees 270

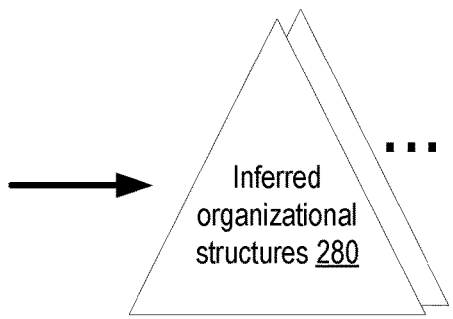

Inferred organizational structures 280

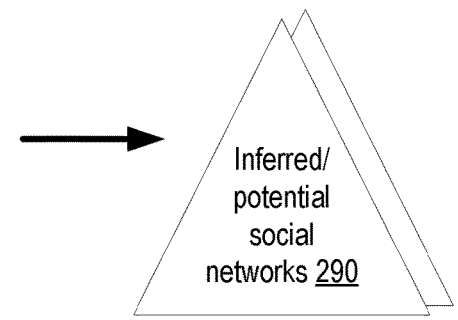

Inferred/potential social networks 290

*FIG. 2*

RELATION GRAPH OPTIMIZATION USING INCONSISTENT CYCLE DETECTION

BACKGROUND

The analysis of observed data collected from a variety of sources using artificial intelligence or machine learning techniques is becoming ever more widespread. As the cost of computing infrastructure has decreased with the growth of cloud-based service providers, it has become easier to analyze large volumes of raw data using sophisticated algorithms. Many applications, including for example log analysis applications, threat analysis applications and the like, involve making inferences based on the content of text records and other unstructured data.

The ability to extract information about potential or actual relationships between named entities and/or events in unstructured data or text has become an increasingly important focus of many application vendors. Such relationship extraction may be used, for example, to create knowledge bases from feedback records (e.g., product reviews or service reviews), to support automated question-answering systems, and the like. Unfortunately, in large text data sets, relationship information extracted from one subset of the data may sometimes be logically inconsistent with relationship information extracted from a different subset of data. For example, one portion of a data set may suggest, with some non-zero probability, that event E1 preceded event E2, while another portion of the data set may indicate, also with non-zero probability, that event E2 preceded event E1. Similar logical inconsistencies with associated probabilities may be exhibited in extracted hierarchical or family relationship information in various contexts.

Depending on the kind of data set being analyzed, relationships may be signaled by a variety of domain-specific signals or indicators. As the data set size increases, the number of potential relationship signals that can be identified within the data set may increase rapidly, which in turn may lead to more inconsistencies. Dealing with such inconsistencies systematically, while still extracting as much useful relationship information as possible from the data set, may present a non-trivial challenge.

BRIEF DESCRIPTION OF DRAWINGS

FIG. 2 illustrates examples of relationship categories in various domains, according to at least some embodiments.

Figure 1:
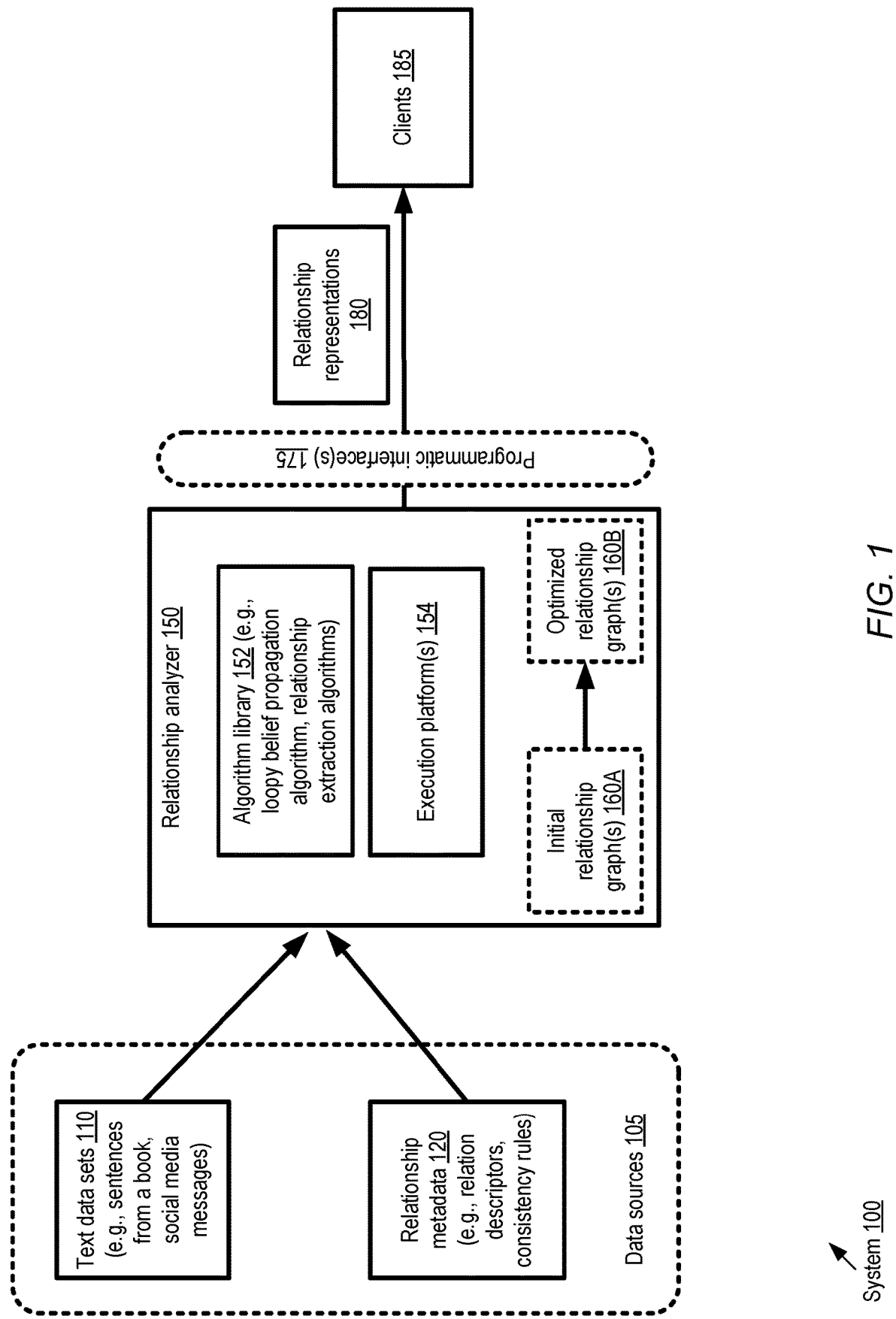
FIG. 1 illustrates an example system environment in which relationship graphs derived from text data may be modified based on an objective function that takes logical inconsistencies into account, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for generating and optimizing relationship graphs derived from text data are described. At a high level, the algorithms described herein may comprise analyzing text sentences (or other text collections such as email messages) to determine probabilities associated with relationships between pairs of entities, constructing relationship graphs with the entities as nodes and the relationships as edges, identifying inconsistent cycles in the graphs and, at least in some cases, pruning selected edges from the graphs based on a multi-factor optimization function which takes inconsistencies and relationship confidence levels into account. The algorithms may be implemented at one or more computing devices which may be collectively referred to herein as a text analyzer or a relationship analyzer. Such an analyzer may, in some embodiments, be incorporated within a network-accessible analysis service or a more general machine learning service; in other embodiments, the analyzer may be implemented in a standalone mode and may not necessarily be associated with or part of a network-accessible service. In at least some embodiments the algorithms may be implemented as part of an electronic book (e-book) or electronic publication distribution service, and the results of the relationship analysis for a given portion or all of a publication may be provided via e-reader devices or e-reader applications. The algorithms may also be applied to data sets derived from a variety of data sources, including books, newspaper articles, magazine articles, resume databases, social networking services used for business/career information and/or personal information, and the like. In at least one embodiment the input text may be extracted from a video (e.g., a motion picture, television program, or a video posted to an Internet-based video service or social networking service). The audio corresponding to such a video may be obtained and transcribed to text to form the data set, or subtitles (if any) provided with the video may be aggregated and used as the data set, for example, in different embodiments. The output produced using the optimization algorithms may provide a consistent probabilistic view of relationships inferred from the input text. Such a view may, for example, be used as supplemental information generated for an e-book, for discovering organizational information, for identifying potential opportunities for expanding/modifying social networks, and so on.

According to one embodiment, a determination may be made, e.g., in response to a client request received via a programmatic interface, that relationship analysis is to performed on a data set comprising a plurality of text collections. At least some of the text collections to be analyzed may include one or more tokens indicating a respective named entity and one or more indicators or signals of a respective relationship between one named entity and another named entity. A set of domain-dependent relationship categories (e.g., family relationship categories such as "is a child of", "is a parent of" etc.) and associated signals/indicators may be identified for the analysis. In some cases, the text collections to be analyzed may first be filtered from a larger corpus of raw text using various techniques such as named entity recognition and relationship signaling keyword recognition—e.g., only a fraction of the sentences in a novel may contain information usable to infer relationships, so those sentences which do not appear to contain relationship information may be excluded from further analysis.

The potentially-informative text collections may be examined in stages to assign probabilities to various relationships at a per-collection level, and an initial relationship graph may be constructed. In the initial relationship graph, in some embodiments the relationship probabilities identified at the per-collection level may be represented using weights assigned to the edges, while the named entities may be represented as the nodes. The weights may be considered approximate indicators of confidence in the evidence used to identify the relationships—e.g., the higher the weight of an edge, the stronger the evidence may be assumed to be for the relationship represented by the edge. (Alternative weight encoding techniques may be used in some embodiments, in which lower weight values correspond to stronger evidence of the relationship.) Depending on the relationship categories for which the analysis is being performed, some relationships (e.g., "is a spouse of") may be un-directed, while others may be directed (e.g., "is a parent of") in various embodiments.

After the initial relationship graph is constructed, it may be analyzed to detect cycles. At this stage of the analysis, in at least some embodiments the directions associated with individual edges or the corresponding relationships may be ignored—that is, cycles may be detected without taking the directions (if any) of their constituent edges into account. Depending on the size of the data set and the total number of relationships signaled by the data set, the relationship graph may become quite large in various embodiments. Accordingly, to keep the amount of computation required within reasonable bounds, a maximum cycle size (e.g., defined in terms of the number of member edges in the cycles) may be selected in some implementations. A given cycle may be classified as a consistent cycle or an inconsistent cycle based on a pre-determined domain-dependent consistency rule set. For example, a cycle which indicates that (a) entity E1 is a parent of entity E2, and also that (b) entity E1 is a sibling of E2 may be deemed inconsistent based on a consistency rule set for family relationships. In at least some embodiments, respective weights may be assigned to respective cycles—e.g., positive weights such as +1 may be designated for consistent cycles while negative weights such as −1 may be designated for inconsistent cycles. In some implementations the weights may be learned using a training set. The consistency rule set may also or instead be learned from a training set in some embodiments, provided/indicated via a programmatic interface by a client on whose behalf the analysis is being performed, or provided/indicated via a programmatic interface by a domain expert familiar with the kinds of relationships being considered.

An objective function which takes the weights of the edges of the initial relationship graph into account, as well as the consistency/inconsistency of cycles into account may then be evaluated using an optimization algorithm. The output of the optimization may comprise assigning a retention score to the edges of the initial relationship graph, so that a second relationship graph can be derived by eliminating some edges associated with at least some inconsistent cycles. Details of the objective function and the optimization techniques which may be used in various embodiments are discussed below. At a high level, the optimization may have two types of goals in some embodiments: to retain as many highly-weighted (and therefore high-confidence) edges as possible, and to remove inconsistencies. Since some edges in an inconsistent cycle may have high weights, the two goals may conflict to some extent. In at least some embodiments, parameters of the objective function may be set (or learned) to represent the tradeoffs between consistency and edge-weight-based confidence. The second relationship graph may be used in various embodiments to provide a representation of the relationships inferred from the text data set, e.g., via a programmatic interface to a client of the text analyzer or analysis service.

In some embodiments, as mentioned above, the relationship analysis may be applied to the text of a book, e.g., a book being read via an e-book reader device or application. A user of the e-book reader may click on the name of one of the characters of the book, for example, and be shown a graphical representation of that character's family tree in one implementation. Alternatively, the user may click on a link (or a different control element supported by the interface being used to read the book) for supplemental information associated with the book, and be provided with family tree information for some or all of the characters of interest. In one embodiment, the amount of relationship information displayed via the e-book reader may depend on how much of the book has been read at the time that the relationship information is requested. For example, the e-book reader may keep track of the progress made by the user within the book, and tailor the displayed relationship information based on only the contents of the portion of the book which has been read thus far. The family tree information displayed when the user/reader has reached chapter ten of the book may be more comprehensive (or at least different) from the family tree information displayed when the user/reader has reached chapter six, for example.

Various parameters or decisions regarding the relationship analysis may be governed by client preferences in some embodiments. For example, clients may specify the sources of the text data to be analyzed, definitions or descriptions of the relationships to be identified, the indicators/signals to be used to identify the relationships, consistency rules to be used to identify inconsistent cycles, the particular algorithms to be employed during various stages of the analysis, and so on. Some or all of these preferences or guidelines may be included in programmatic requests transmitted by the clients to the text analyzer in various embodiments.

Example System Environment

FIG. 1 illustrates an example system environment in which relationship graphs derived from text data may be modified based on an objective function that takes logical inconsistencies into account, according to at least some embodiments. As shown, system 100 may comprise data sources 105 and a relationship analyzer 150. Data sources 105 may include at least one source from which text data sets 110 may be obtained, and one source from which relationship metadata 120 may be obtained. Text data sets 110 may comprise, for example, the content of various books, magazines and other periodicals, e-mail repositories, text-message (SMS or short message system) repositories, social media message/status repositories and the like. In some cases the data source may comprise a stream of records that arrive at unpredictable rates and times, while in other cases a static set of text data may be analyzed for relationships. The relationship metadata 120 may include, for example, computer-readable descriptors of various relationship categories, the consistency rules associated with the relationships and so on.

Generally speaking, the relationship analyzer 150 may comprise one or more computing devices collectively configured to implement a set of algorithms and models on text data sets to generate optimized relationship graphs 160B, from which relationship information 180 can be provided to the analyzer's clients 185 via one or more programmatic interfaces 175. A variety of statistical or machine learning algorithms of the analyzer's algorithm library 152 may be employed in various stages of the processing of the text data in the depicted embodiment. For example, a number of relationship extraction techniques may be used to generate initial relationship graphs 160A, and algorithms such as loopy belief propagation or a greedy edge retention algorithm may be used to derive the corresponding optimized relationship graphs 160B from the initial relationship graphs. A number of execution platforms 154 may be available in the depicted embodiment for the computations involved in relationship extraction, graph construction and optimization, and so on. In some embodiments, at least some phases of the processing may be performed in parallel, such as the cleansing and normalization of raw test data, the assignment of relationship probabilities at the per-sentence level or at a sentence group level (in which case relationship probabilities may be determined from a set of contiguous sentences at a time, instead of from a single sentence), and so on.

A number of different types of programmatic interfaces 175 may be implemented by the relationship analyzer in various embodiments, including for example a set of application programming interfaces (APIs), a web-based console, command-line tools, generic or custom graphical user interfaces, and so on. In some embodiments, the data sources may comprise electronic books (e-books), and the representations of the relationship graph may be provided via portable e-book reader devices or via applications run on client-owned tablet computers, smart phone devices and the like.

In various implementations, the overall workflow implemented by the relationship analyzer for a given text data set 110 may consist of several phases, including for example text pre-processing, per-sentence (or per-sentence-group) relationship extraction, building an initial relationship graph, optimizing the relationship graph, and generating the output representation 180. Additional details regarding each of these phases are provided below. The following discussion of the workflow steps is provided in an example context in which a book's sentences are analyzed to identify family relationships between persons named in the book. It is noted that the techniques described may be generalized to a variety of other contexts and are not limited to family relationships or to data sets derived from books.

Pre-Processing

The raw text may first be divided into groups such as sentences (or other similar text collections) using a delimiter set in various embodiments. It is noted that in much of the remainder of this document, sentences may be used as the primary text collection examples, although groups of text tokens that do not necessarily form grammatically valid sentences (for example, some communications may involve words from several languages, emojis or other graphical symbols, and so on) may be used for relationship analysis in at least some embodiments.

A named entity recognizer (NER) may be used in some embodiments to identify the subset of sentences (or text collections) which contain references to named entities. Such occurrences of named entities may be referred to as "mentions" herein. For example, if a sentence contains the names "Adam" and "Bjorn", the sentence may be described as containing two mentions.

From among this first subset of sentences with mentions, a potentially smaller subset that contains relationship signals or indicators (e.g., the terms "brother", "sister", etc.) may be identified in various embodiments. The set of signals/indicators may be provided in some embodiments by the client on whose behalf the analysis is being performed. In other embodiments, the relationship analyzer may utilize knowledge base entries to identify the signals. In one embodiment, the tokens in the sentences that remain after these two stages of filtering may be converted to all-lower-case or all-upper-case and/or lemmatized. Case conversion and lemmatization are language-dependent transformations, and may not necessarily be performed in some scenarios depending on the language whose text collections are being analyzed—e.g., some languages do not have the concept of separate lower and upper cases, so case conversion may not be required. Other pre-processing operations may also or instead be performed in some embodiments.

The pre-processed text may be divided into a training subset and a test subset in some embodiments. The training subset may be used to generate predictive models used for relationship extraction (as discussed below), and the test subset may be used to evaluate the quality of the predictions made by the models. In some embodiments, an additional cross-validation procedure may be performed. After the models have been trained, they may be used on previously unseen data sets in production mode.

Per-Sentence Relationship Extraction

Consider a sentence s which contains two mentions m1 and m2 in the context of a set of relationship categories for which predictions have to be made with respect to m1 and m2. Assuming that some of the categories are undirected relations (e.g., "is a sibling of", in which case "A is a sibling of B" is equivalent of "B is a sibling of A") while others are directed or directional (e.g., "is a parent of", in which case "A is a parent of B" is not equivalent to "B is a parent of A"), the task of sentence-level relationship prediction may be decomposed into two phases in some embodiments. Generally speaking, a given relationship r may be said to comprise two components: an undirected component $r_u$ and a directed component $r_d$ ($r_d$ may be set to null for relationships which do not have a direction). In the first phase of relationship prediction for a sentence, the probability of an undirected relationship with respect to a given category on the basis of the sentence content may be determined. In second phase, for those categories which have an associated direction, the probability of the direction being from left to right (m1 to m2) or from right to left (m2 to m1) may be determined. The overall probability of a relationship r may be expressed as the product of the probabilities of $r_u$ and $r_d$ as shown in Equation 1 (with the second term, the probability of $r_d$ being set to 1 for relationships without a direction component).

$$P(r|s,m1,m2) = P(r_u|s,m1,m2) \cdot P(r_d|r_u,s,m1,m2) \quad \text{Equation 1:}$$

The decomposition into the undirected and directed probability terms may enable the analysis to remain agnostic with respect to whether the model features used for predicting $P(r_u|s,m1,m2)$ apply to m1 or to m2. As a result, the predictive model's data sparsity may be reduced, and the performance of the model may be improved relative to models which do not use the decomposition. In at least some embodiments, the undirected relationship may be predicted using the following multi-class logistic regression model (e.g., with L2 regularization used in training):

$$P(r_u|s,m1,m2) \propto \exp(b_{ru} + \Sigma_i w_{ru,i} f_i(s,m1,m2)) \quad \text{Model M1:}$$

In model M1, b denotes the bias for relationship $r_u$, the $f_i$ term denotes the value of the $i^{th}$ feature of the model, and $w_{ru,i}$ indicates the weight of the feature. As mentioned above, since it deals with the probabilities of undirected relationships, M1 may not distinguish between the two mentions as such—that is, in this stage of the analysis, to reduce sparsity and/or for other reasons, the mention terms m1 and m2 may each be replaced by a generic mention term m. A number of different features may be obtained from the sentences for this phase of the analysis in different embodiments, including for example n-grams (contiguous sequences of n words or tokens) of up to a maximum length, skip-ngrams (token sequences from which selected numbers of intervening terms between two mentions are skipped) and tuple-left-tokens (cross-products of tokens which occur immediately before the mentions in the sentence). From a sentence which contains the tokens "John was talking to his father James", the skip-ngram feature of length three "<m> - - - - "father"<m>" may be obtained. Actual names such as John and James may be replaced by generic mention terms during the analysis, so that model M1 is not tied to specific names. The dashes correspond to skipped tokens, and the length three indicates that both mentions and the signaling token "father" are present in this example. A tuple-left-token feature may comprise a cross-product of the respective tokens just before two mentions, with the feature being extracted to capture interaction between the contexts of the two mentions. From a sentence which contains the sequence "Aunt <m1> and Uncle <m2>", for example, a tuple-left-token comprising the cross-product of <"Aunt"×"Uncle"> may be obtained as evidence of a spousal relationship (in addition to other features potentially indicating a niece/nephew relationship). In some embodiments, features that occur less than a threshold number of times may be pruned from the training data set so as to reduce feature sparsity.

In one embodiment, the direction of the relationship (for those relationships which have a non-null direction) may be predicted using the following binary logic regression model (e.g., also with L2 regularization used in training):

$$P_{dir}(r_d = \text{left}|r_u,s,m1,m2) \propto \exp(b_{ru} + \Sigma_i w_{ru,i} f_{ru,i}(s,m1,m2)) \quad \text{Model M2:}$$

In model M2, b denotes a bias for relationship $r_u$, the $f_{ru,i}$ term denotes the value of the $i^{th}$ feature of M2, and $w_{ru,i}$ indicates the weight of the feature. A number of different features may be obtained from the sentences for the direction-related phase of the analysis in different embodiments, including for example n-grams of a selected range of lengths that contain both mentions involved. It is noted that although only sentence-level relationships involving two named entities or mentions are discussed here, models for relationships involving more than two mentions may also be trained in various embodiments. Instead of or in addition to using models similar to M1 or M2, in at least some embodiments one or more artificial neural network models may be employed to determine the per-sentence relationship probabilities. In some embodiments a number of different execution platforms may be used for the per-sentence analysis—e.g., respective partitions of the data set may be analyzed in parallel at respective servers. As mentioned earlier, in some embodiments groups of at least some contiguous text sentences may be analyzed as a group to obtain relationship probabilities, e.g., instead of or in addition to analyzing a single sentence at a time.

Building the Initial Relationship Graph

In various embodiments, co-reference resolution may be performed on the mentions, e.g., so as to resolve duplicate references to the same entity. A co-reference resolution technique may be able to determine, for example, that the names "A. B. Jones", "Alan Jones" and "Alan Bradley Jones" all correspond to the same individual. The nodes of the initial relationship graph may correspond to the named entities, and the edges may correspond to the relationships for which non-zero per-sentence probabilities have been determined (e.g., using models similar to M1 and/or M2). Each edge may be assigned a weight derived from the individual per-sentence probabilities of the relationship represented by the edge. For example, in one implementation the approach corresponding to the following equation for an edge weight $w_e$ for edge e may be taken with respect to sentences s:

$$w_e = \Sigma_{s: \text{prediction}=(m1,m2,r)} P(r|s,m1,m2) \quad \text{Equation E2:}$$

In the edge weighting method of equation E2, relationships that are predicted by many different sentences may be given higher weights. The summation condition "s:prediction=(m1,m2,r)" indicates that the summation is to be performed over only those sentences in which the relationship corresponding to e had the highest probability among the (potentially multiple) relationships for which non-zero probabilities were predicted. In other embodiments, a different summation condition may be used, such as "s:{m1,m2}∈s", in which case the probabilities associated with all sentences in which m1 and m2 appear may be used to derive $w_e$. This second, more lenient summation condition may lead to larger graphs than the summation condition of equation E2 in various embodiments. Larger graphs may lead to higher recall at least in some cases, but with an accompanying reduction in precision.

Relationship Graph Optimization

Cycles within the initial relationship graph may be identified, e.g., using any of various cycle detection algorithms. It is noted that relationship directions may not be taken into account when identifying cycles in at least some embodiments, or for at least some analysis domains. In other embodiments or for other domains, relationship direction may be considered when identifying cycles. Finding all the cycles in a large graph may be computationally expensive, so a limit on the maximum size of the cycles to be identified may be set in various embodiments—e.g., only cycles with 2, 3, 4, or 5 edges may be identified. Each cycle may be classified as consistent or inconsistent based on a set of rules associated with the domain—e.g., a cycle which indicates "A is a sibling of B", "B is a sibling of C" and "C is the grandfather of A" may be designated as inconsistent based on family relationship consistency rules.

An objective function similar to the following may be used for the optimization in at least some embodiments:
Objective Function OF1:

$$\text{argmax}_x \sum_{e \in edges} x_e w_e + \lambda \sum_{c \in cycles} \left(\prod_{e \in c} x_e\right) w_c$$

In this function, the $w_e$ terms are the weights of the edges in the initial relationship graph (computed as discussed above, e.g., using an equation similar to E2), and the $w_c$ terms are the weights assigned to cycles c identified in the initial graph. In one embodiment, $w_c$ may be greater than zero if the cycle c is consistent, and less than zero if it is inconsistent. In some implementations, the cycle weights $w_c$ may be set as pre-selected parameters of the optimization, e.g., to +1 for consistent cycles and −1 for inconsistent cycles; in other embodiments, the cycle weights $w_c$ may be learned from a data set with a sufficiently large number of relationship graphs. The $x_e$ term for an edge e is a binary indicator in OF1, set to one if e is to be retained in the optimized graph, and set to 0 if e is to be eliminated/removed from the optimized graph. The product term in which the $x_e$s of the edges of a cycle are multiplied ensures that the cycle weight associated with a given cycle is only used to compute the objective function if all the edges of the cycle are retained. In effect, OF1 represents an objective function that attempts to retain as many edges (with a preference for edges with higher $w_e$ values) in the optimized version of the graph, while also removing at least some inconsistencies. The $\lambda$ term represents a tradeoff between retaining edges based on $w_e$ and rejecting edges based on cycle inconsistency. In at least some embodiments, a tradeoff parameter value $\lambda > 0$ may be selected based on domain-specific heuristics and/or based on knowledge base entries. $\lambda$ may be considered a hyper-parameter, which may be tuned using a validation set in at least one embodiment. At one extreme, if $\lambda$ is set to zero, all the edges of the initial relationship graph would be retained regardless of their membership in inconsistent cycles. At the other extreme, if $\lambda$ is set to a very high positive value, all inconsistent cycles may be broken, even if some or all of the edges in some or all of the inconsistent cycles had high edge weights, which may lead to possible loss of recall. The parameter $\lambda$ (or similar parameters which may be used in variants of objective function OF1 in different embodiments) may be referred to herein as an edge retention tradeoff parameter.

Generating Output Representation

The manner in which the information contained in the optimized relationship graph obtained using the above technique is presented or provided may depend on client preferences and/or on context in various embodiments. For example, a client may indicate whether a pictorial view of the complete optimized relationship graph is to be provided, or whether the optimized relationship graph is to be presented in a machine-readable format for consumption by a program, and so on. In some cases, even when a complete optimized relationship graph has been constructed for a given data set, only a portion of it may be presented, as discussed below in the context of electronic book reader devices.

Relationship Categories

The kinds of relationships for which graphs may be generated from unstructured data sets may vary for different application domains. FIG. 2 illustrates examples of relationship categories in various domains, according to at least some embodiments. Several different relationship categories 260 for three domains are shown: family relationships, workplace relationships, and social media relationships. Each category has a name, and an indication as to whether the relationships of that category are undirected or directed. The family relationships shown include sibling, parent, grandparent, child, grandchild, spouse, cousin, aunt/uncle, nephew/niece, and step-relative. It is noted that the set of family relationships relevant to a given data set may differ based on the language used in the dataset and/or the culture or historical period to which the data set corresponds. In some cultures and languages, for example, there are distinct terms relationships such as "elder brother", "eldest brother", "younger brother", "elder sister", "eldest sister", "younger sister", "father's elder brother", "father's younger brother", "mother's elder sister" and so on, which may justify a larger set of family relationship categories than those shown in FIG. 2. The relationship graphs associated with the family domain may be used to generate inferred family trees 270 in various embodiments.

In the business or workplace domain, relationships may be based on reporting hierarchies (e.g., "reports-directly-to" or "reports-indirectly-to"), workplace location (e.g., "works in the same location as") or based on group/department names (e.g., "is in the same department as"). Such relationships may be used to generate inferred organizational structures 280 in various embodiments. Social media domain relationships, such as "has sent messages to", or "shares an interest in" may be used to generate inferred real or potential social networks 290, for example. In at least one embodiment, when analyzing a given text data set using the techniques outlined above, relationships from more than one domain (e.g., for both a family domain and a workplace domain) may be extracted. The corresponding optimized graphs may also have edges from different domains in such embodiments.

Analysis Stages

Figure 3:
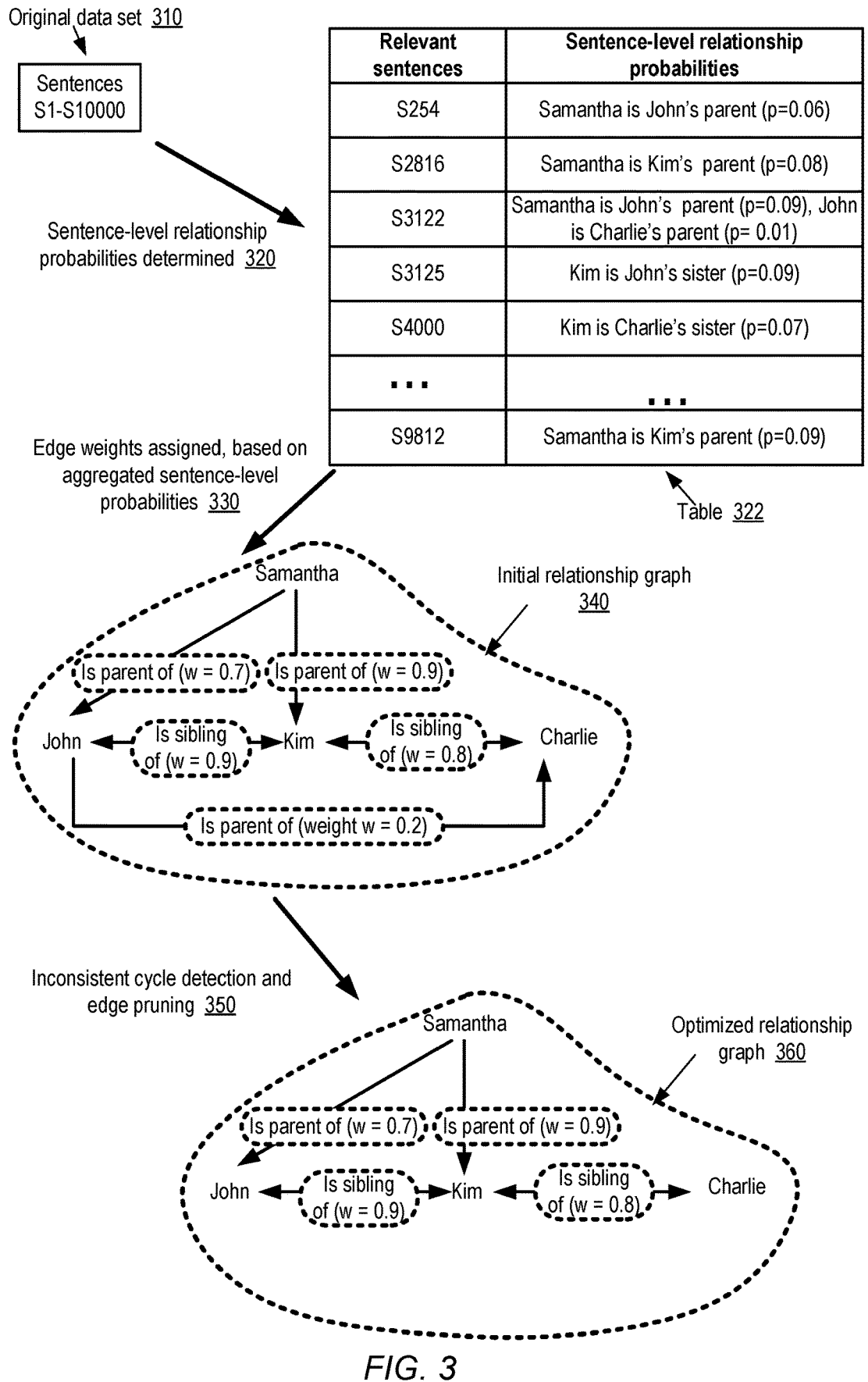
FIG. 3 provides an overview, using a toy example, of the stages of a text analysis technique which may be used extract family relationships, according to at least some embodiments.

FIG. 3 provides an overview, using a toy example, of the stages of a text analysis technique which may be used extract family relationships, according to at least some embodiments. The toy example pertains to family relationship to be predicted from a data set comprising text sentences. Original data set 310 may comprise 10000 sentences labeled S1-S10000 respectively. From the original data set, a subset of relevant sentences may be extracted, e.g., using pre-processing techniques of the kind described above. As indicated by arrow 320 and table 322, sentence-level relationship probabilities may be determined for the relevant sentences, e.g., using models similar to models M1 and M2 discussed above. For example, the models may indicate that based on sentence S2186, entity "Samantha" has an 8% (0.08) probability of being a parent of entity "Kim"; and that based on sentence S4000, entities "Charlie" and "Kim" have a 7% probability of being siblings, etc. In general, a given sentence may result in a non-zero probability being assigned to any number of relations—that is, as in the case of sentence S3122, more than one relationship probability may be derived from a given sentence. In some embodiments, respective probabilities for inconsistent relationships may be derived from a single sentence—e.g., the same sentence may lead to a p1% probability being assigned to "A is B's parent" and a p2% probability being assigned to "A is B's sibling".

From the per-sentence relationship probabilities, an initial (un-optimized) relationship graph 340 may be constructed. The nodes in graph 340 may represent the named entities identified in the relevant sentences, and the edges may represent the relationships. As indicated by arrow 330, the edge weights w may be obtained by aggregating sentence-level probabilities in at least some embodiments. It is noted that the edge weights may not represent probabilities themselves in some implementations—e.g., they may take on values greater than 1 (the maximum possible value if probabilities were being used and a scale of 0-1 were being used for the probability values) depending on the functions used to derive them from the underlying sentence-level probabilities.

The initial graph 340 may be analyzed for the presence of cycles. The cycles may be classified as consistent or inconsistent based on a rule set defined for family relationships. In graph 340, for example a cycle involving John, Kim and Charlie may be classified as inconsistent because it indicates that John and Charlie are siblings with non-zero probability (as both happen to be siblings of Kim) and also that John has a non-zero probability of being the parent of Charlie. Using an objective function similar to OF1 discussed above, a decision may be made that the edge indicating that John could be a parent of Charlie should be pruned from graph 340 (as suggested by arrow 350), resulting in the optimized graph 360. A representation of the optimized graph (or at least some relationships indicated in the optimized graph) may be provided to the client on whose behalf the analysis is being conducted.

Methods for Generating and Optimizing Relationship Graphs

Figure 4:
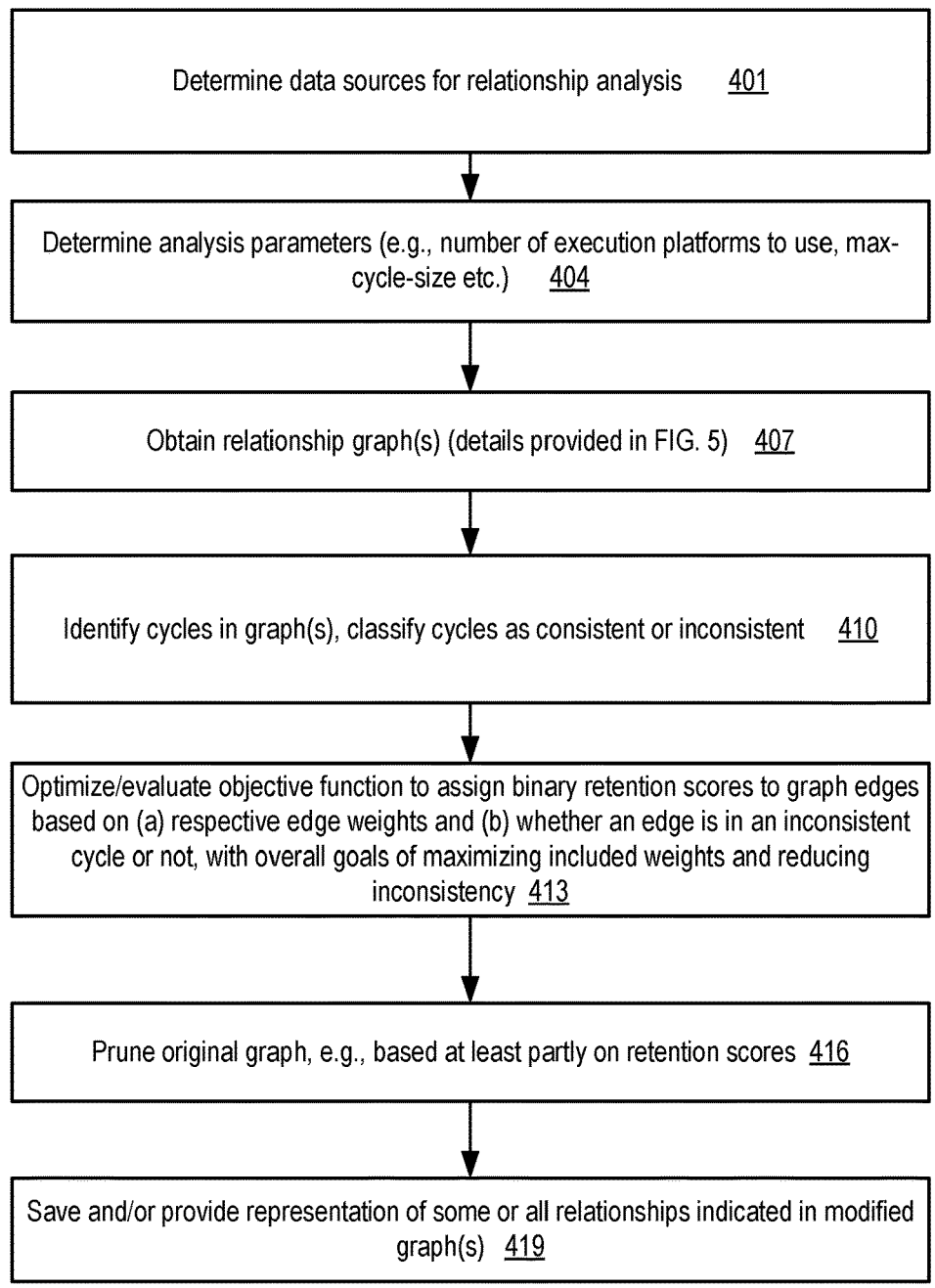
FIG. 4 is a flow diagram illustrating aspects of operations that may be performed to generate optimized relationship graphs, according to at least some embodiments.

FIG. 4 is a flow diagram illustrating aspects of operations that may be performed to generate optimized relationship graphs, according to at least some embodiments. As shown in element 401, the data source(s) to be used for relationship analysis may be identified. Multiple sources may be identified for a given application—e.g., text messages and/or emails from several distinct repositories may be analyzed together. The settings of various parameters for the analysis workflow may be determined (element 404), such as the maximum size of the cycles to be identified in the relationship graphs, the number of execution platforms to be used in parallel (e.g., for the per-sentence relationship extraction), and so on. In some embodiments, at least some parameter values of the particular modeling techniques to be employed for the per-text-collection predictions and/or the optimization procedure (such as the edge retention tradeoff parameter λ) may be selected based on heuristics or knowledge base entries. In at least one embodiment, as discussed earlier, an edge retention tradeoff parameter may be tuned using a validation set.

Using the text collections obtained from the data sources, an initial relationship graph may be constructed for named entities identified in the text collections (element 407), with the edges representing weighted relationships and the nodes representing the entities involved in the relationships. Details of the graph generation techniques that may be employed in some embodiments are provided in FIG. 5 and discussed below. One or more cycles may be identified in the initial relationship graph (element 410), and classified as either consistent or inconsistent based on rules associated with the domain to which the text collections pertain. (Of course, in some cases no cycles may be detected, or all the cycles that are detected may be classified as consistent cycles; in such scenarios, optimization of the initial relationship graph may not be required.)

In scenarios in which at least one inconsistent cycle is identified, an objective function may be optimized or evaluated to assign retention scores to edges of the initial graph (element 413). The retention scores may, for example, correspond to the probabilities that the $x_e$ terms discussed earlier in the context of objective function OF1 have the value 1. The objective function may take edge weights into account, as well as whether a given edge belongs to an inconsistent cycle or not (with cycle weights also being considered, as indicated in the discussion of OF1), with the overall goals of retaining a cumulative high edge weight, while also removing at least some inconsistencies from the original graph. Any of a number of algorithms may be used for the optimization (e.g., maximization) of the objective function, such as belief propagation algorithms, greedy algorithms which consider edges in decreasing order by weight for inclusion in the optimized graph, and so on. Based on the retention scores assigned via the objective function optimization, at least some edges may be removed or pruned from the initial relationship graph (element 416). A representation of some or all of the relationships indicated in the modified or optimized graph may be saved and/or provided via a programmatic interface to a client on whose behalf the analysis was initiated (element 419).

Figure 5:
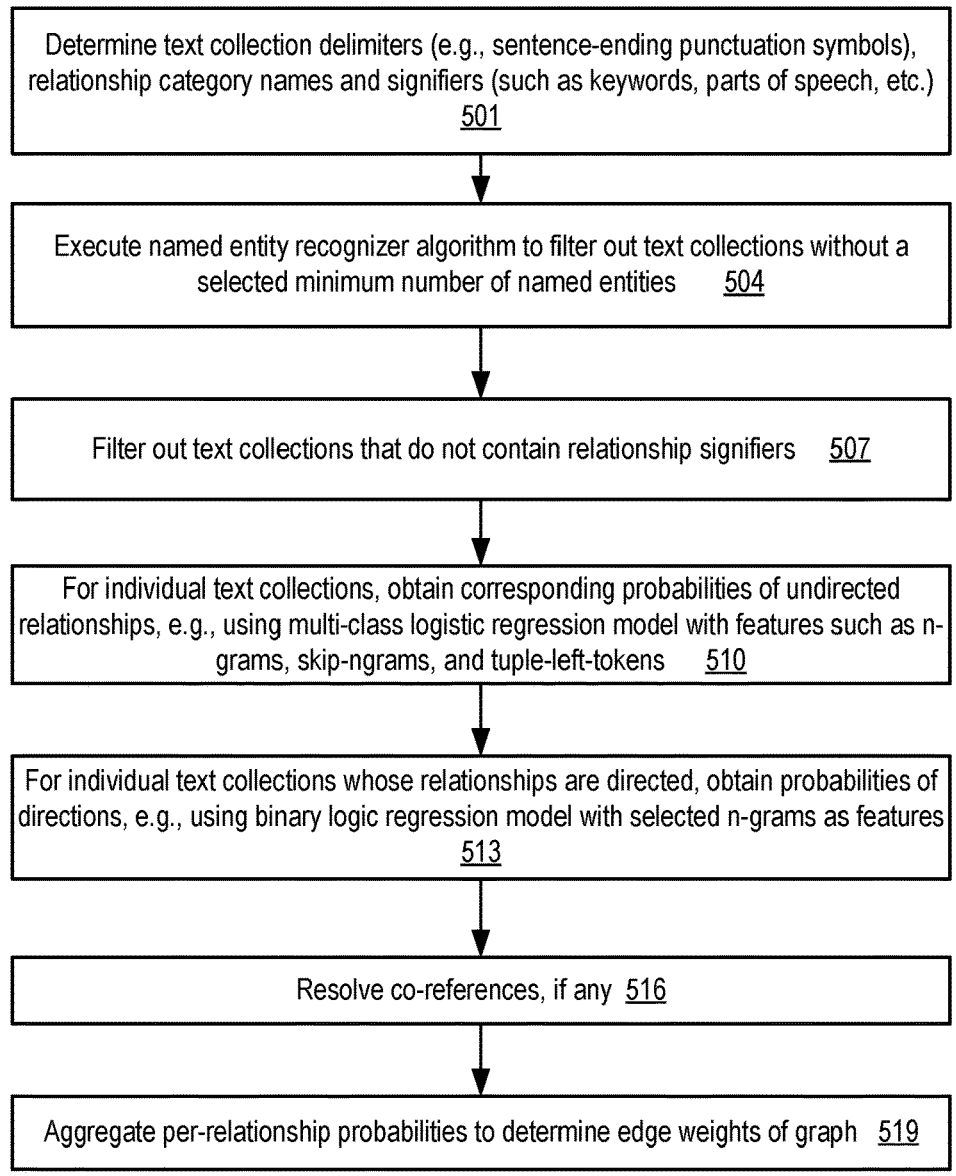
FIG. 5 is a flow diagram illustrating aspects of operations that may be performed to generate an initial relationship graph from a text data set, according to at least some embodiments.

FIG. 5 is a flow diagram illustrating aspects of operations that may be performed to generate an initial relationship graph from a text data set, according to at least some embodiments. As shown in element 501, a set of delimiters (such as periods, question marks or exclamation marks) which denote the boundaries of text collections (e.g., sentences) may be identified for a data set to be analyzed. In addition, the names of the relationships to be identified (such as "is sibling of") and corresponding signifiers such as keywords (e.g., the terms "brother", "sister", etc.) may be determined. In some embodiments the delimiters, relationship labels and signifiers/indicators may be included in relationship descriptors which may be provided by a client on whose behalf the analysis is to be performed, or may be obtained from a domain-specific knowledge base. A named entity recognizer algorithm may be employed to filter out, from the complete set of text collections of the data set, those collections which do not include a selected minimum number of named entities (element 504). Similarly, text collections that do not contain a selected minimum number of relationship signifiers/indicators may be filtered out (element 507).

Per-text-collection probabilities of relationships may be inferred in two stages in the depicted embodiment. First, as indicated by element 510, probabilities of undirected relationships may be obtained (element 510), e.g., using a multi-class logistic regression model similar to model M1 discussed above, whose features may include n-grams, skip-n-grams, and tuple-left-tokens. For those relationships which have direction semantics, a second model (e.g., a binary logic regression model similar to model M2 discussed above) may be used to determine the probability of one or more directions (element 513). This second model may utilize its own set of features, such as n-grams of a selected set of lengths. Co-references, if any are identified, may be resolved (element 516).

Multiple text collections may have associated non-zero probability predictions for a given instance of a relationship in the depicted embodiment. For example, out of a corpus of 1000 sentences, 20 might provide some indication that "John" is a sibling of "Jim". Accordingly, the individual text-collection-level probabilities may be combined, e.g., using a selected aggregation function similar to that shown in equation E2, to obtain the respective weights to be assigned to various edges of the initial relationship graph (element 519). The initial relationship graph may then be examined to identify cycles, and the cycle-based optimization may be initiated as discussed above.

It is noted that in various embodiments, at least some operations other than those illustrated in the flow diagrams of FIG. 4 and FIG. 5 may be used to implement the relationship analysis techniques described above. Some of the operations shown may not be implemented in some embodiments or may be implemented in a different order, or in parallel rather than sequentially.

Example e-Book Device Using Optimized Relationship Graphs

Figure 6:
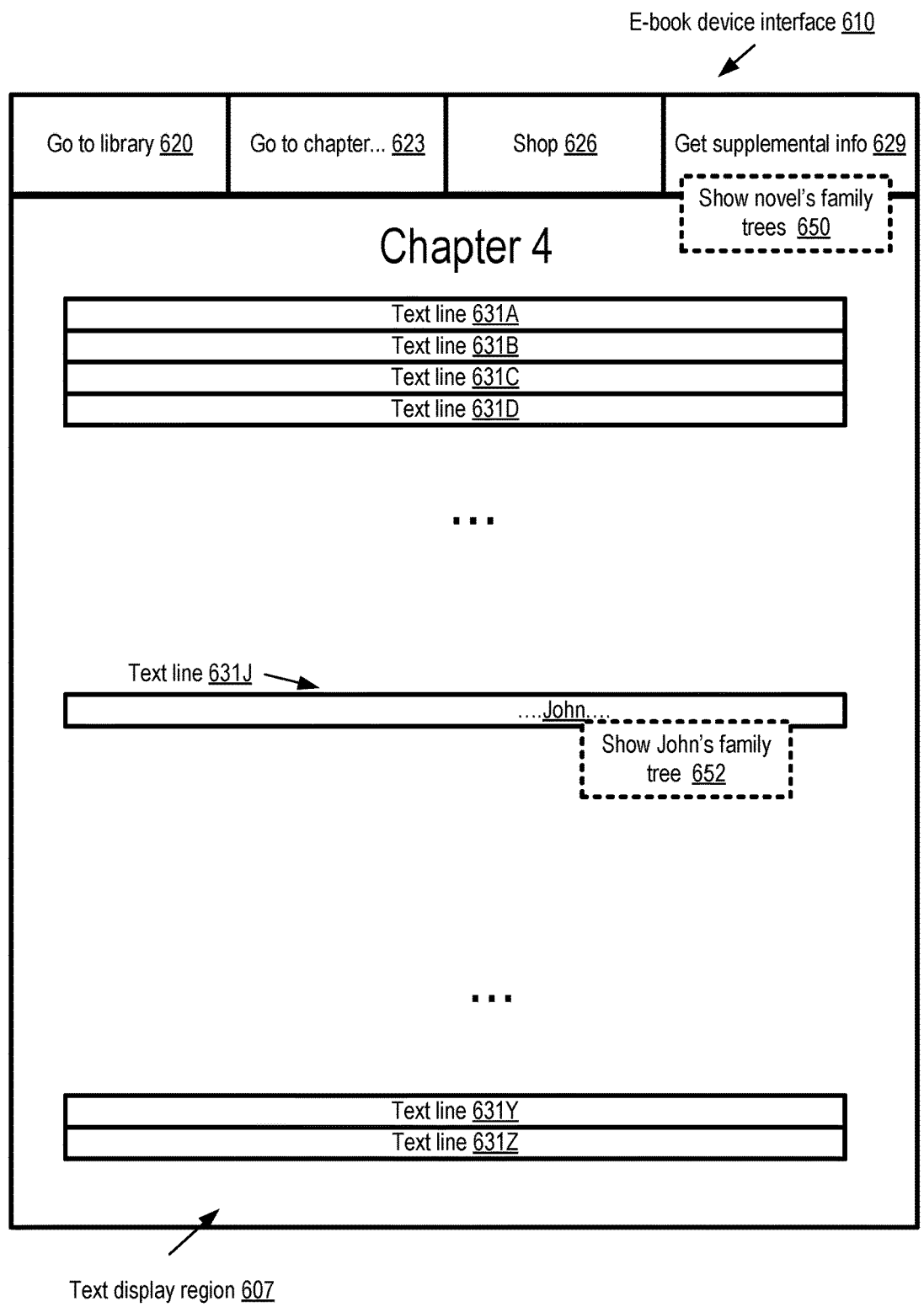
FIG. 6 illustrates an example electronic book device interface which may be used to request and view relationship information extracted from a book, according to at least some embodiments.

FIG. 6 illustrates an example electronic book device interface which may be used to request and view relationship information extracted from a book, according to at least some embodiments. The e-book device interface 610 may comprise a text display region as well as a set of controls in the depicted embodiment. In the text display region 607, a number of lines 631 (e.g., 631A-631Z) of text of a particular chapter (Chapter 4) of a novel are being displayed in the depicted example. The control region may include respective control elements for accessing a library of electronic books (element 620), navigating around the currently-displayed book (the "go to chapter . . . " element 623), shopping for books (element 626) and obtaining supplemental information about the currently-displayed book (element 629). Among the options available via the supplementary information control element 629, option 650 (e.g., displayed as a pop-up region) may enable the reader of the e-book to request a display of the family trees of various characters in the book being read. Similar controls may be provided in electronic book applications which can be run on general-purpose devices such as laptops, tablets, smart phones and the like in various embodiments—that is, a dedicated book-reading device may not be required for the deployment of the relationship graph optimization techniques on behalf of clients.

In at least one embodiment, the reader may also obtain relationship information by highlighting or otherwise indicating the names of specific characters in the book. For example, text line 631J contains the name "John" in the depicted example. If the reader highlights the name John (e.g., using a touch-sensing interface of the electronic book device or application, or using a mouse), a pop-up region 652 enabling the reader to request John's family tree may be provided. Controls for requesting supplementary information such as relationship trees or social networks of the characters in a book may also be supported in audio-book devices or applications in some embodiments. In some cases the request for the family tree may be implicit—e.g., if the reader highlights/selects the name John, this may be interpreted as a request for the family tree, and John's family tree may therefore be displayed without requiring additional user-generated requests. In one embodiment, a user may be able to indicate, e.g., in a set of customizable preferences of the e-book device or application, that when a character's name is highlighted, the family tree of the character should be displayed.

Figure 7:
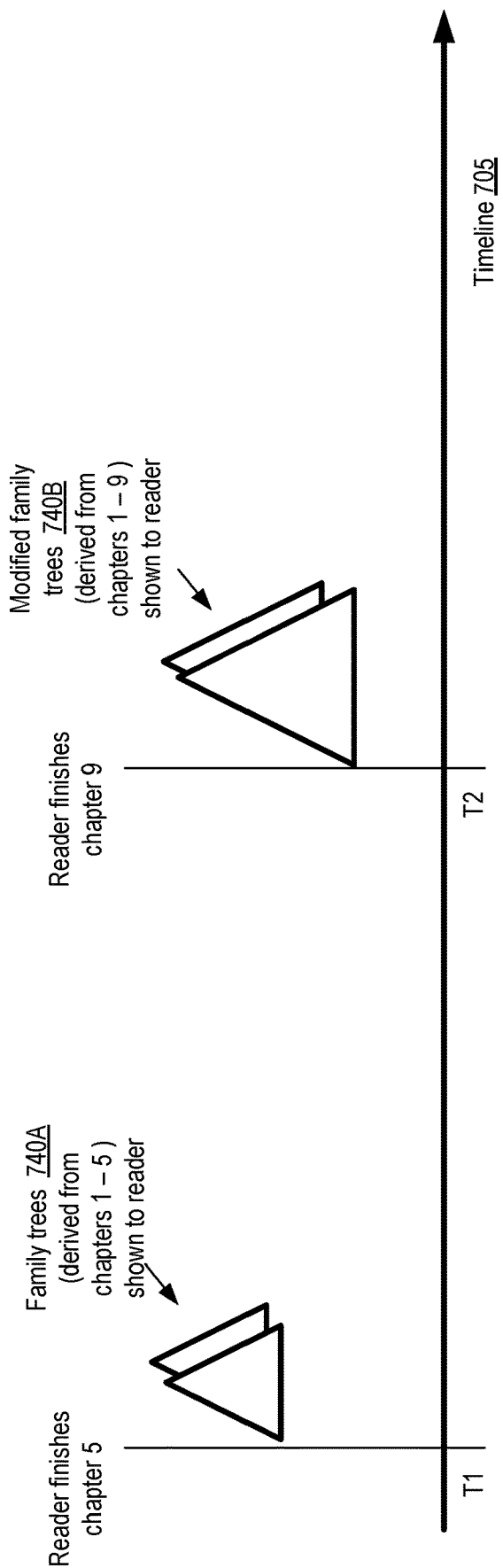
FIG. 7 illustrates an example timeline, during which respective versions of relationship information from an electronic book device may be provided at different times to a reader, according to at least some embodiments.

In some books, more details (and/or greater certainty) regarding the relationships between characters may become available as more of the book is read. In some cases, revealing complete relationship information before the evidence for some of the relationships has been seen by a reader may be counter-productive (e.g., a surprise ending of a story may be revealed before the reader has reached the end). FIG. 7 illustrates an example timeline, during which respective versions of relationship information from an electronic book device may be provided at different times to a reader, according to at least some embodiments. In timeline 705, at time T1, a reader has read chapters 1 through 5 of a book. Accordingly, at or shortly after T1, the e-book device or application being used may provide family tree information 740A based on the sentences of chapter 1 through chapter 5, and may exclude any additional relationship information detectable only after chapter 5 in the book. At time T2, the reader may have completed reading additional chapters 6 through 9. Shortly after time T2, for example in response to a similar request for supplemental information as the request that led to the display of family tree versions 740A, the e-book interface may provide a different version 740B of the family trees that can be inferred from the content of chapters 1 through chapter 9. As suggested by the relative sizes of the tree representations, in at least some embodiments one or more relationships indicated in version 740B may not have been shown in version 740A. Of course, it may sometimes be the case that some of the relationships predicted in the earlier version may have been incorrect in view of chapters 6-9. That is, the contents of chapters 6-9 may result in the removal of one or more edges from the relationship graphs generated at or shortly after T1, so a tree 740B may not show one or more of the corresponding relationships.

Note that, from the perspective of the provider of the e-book device, the text of the entire book may be available for analysis before any requests for family tree information are received. To avoid revealing plot details or storyline changes before the reader has reached the corresponding part of the book, several versions of the relationship graphs based on respective subsets of the book may be generated using the techniques discussed above in the depicted embodiment. In some embodiments, respective versions of the family trees may be generated on demand, e.g., based on the progress made by the reader at the time the family tree information is requested. In other embodiments, respective family tree versions 740 may be pre-generated for various sections of the book, and the one closest to the point of progress of the reader may be presented to the reader.

As mentioned earlier, in some embodiments the text which is analyzed for relationship information may be obtained from a video such as a motion picture, a television program, a video posted on the Internet or to a social networking service, and so on. The audio portion of the video may be obtained and converted/transcribed to text. Sentences may be extracted from the converted/transcribed audio and examined using the approaches described above. If subtitles or transcripts are available, they may be used as at least part of the input data set for the kinds of algorithms discussed above. In one embodiment a video player (e.g., an application installed on a tablet device, a smart phone, or a standalone video display device) may provide a programmatic user interface (e.g., a settings/preferences control) enabling a user to specify that relationship information is to be extracted from a video. In response to the activation of the relationship extraction functionality, the audio portion of a particular live stream or replay of a video may be captured, converted to text in real time or near-real time and analyzed to obtain relationship information in a manner similar to that described above. The video player may also provide interfaces enabling a user to request and receive relationship information regarding some or all of the characters of the video—e.g., a verbal request for relationship information regarding one or more characters may be issued by a user, and a graphical representation of the relationships identified may be displayed in response.

Machine Learning Service

Figure 8:
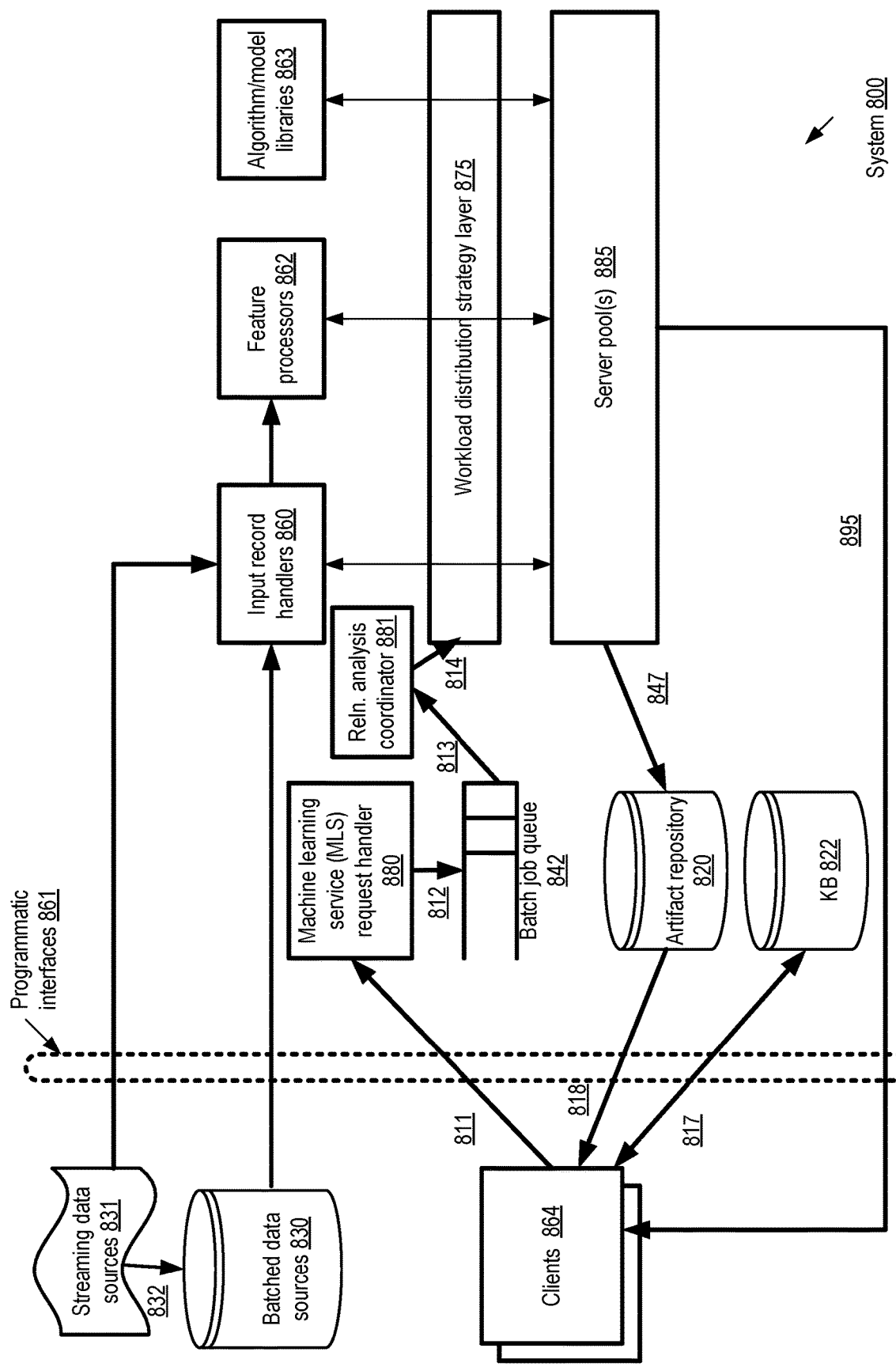
FIG. 8 illustrates an example machine learning service at which relationship information may be extracted from text data sets, according to at least some embodiments.

In some embodiments, some or all of the algorithms for generating and optimizing relationship graphs described above may be implemented at a machine learning service of a provider network. FIG. 8 illustrates an example machine learning service at which relationship information may be extracted from text data sets, according to at least some embodiments. Networks set up by an entity such as a company or a public sector organization to provide one or more services (such as various types of multi-tenant and/or single-tenant cloud-based computing or storage services) accessible via the Internet and/or other networks to a distributed set of clients or customers may be termed provider networks in this document. Provider networks may also be referred to as "public cloud" environments. The machine learning service of system 800 of FIG. 8 may include numerous physical and/or virtual computing devices, with each such device comprising one or more threads of execution. A large number of such computing devices spread over numerous geographically-dispersed data centers may be used for machine learning tasks or statistical computing tasks in some provider networks.

In the depicted embodiment, input data for various types of analysis (including relationship analysis) may be obtained from at least two types of sources: batched data sources 830 and streaming data sources 831. In addition to a relationship analysis coordinator 881 responsible for managing the implementation of the algorithms discussed earlier, the machine learning service (MLS) may comprise a request handler 880, a knowledge base 822 and an artifacts repository 820. The knowledge base 822 may represent a growing collection of entries representing insights gained during earlier instances of the use of relationship analysis techniques (as well as other algorithms) for a variety of data sets, and may be used to guide some of the decisions made by the coordinator 881, such as the selection of the particular type of algorithm to be used for a given set of input data at a particular stage of the analysis, initialization parameters, etc. The artifacts repository 820 may be used to store interim and/or final results of relationship analysis operations, values of the parameters selected, and so on.

A set of programmatic interfaces 861 may be implemented at the machine learning service for interactions with clients 864 in the depicted embodiment. The interfaces may include, for example, one or more web-based consoles or web pages, application programming interfaces (APIs), command-line tools, graphical user interfaces (GUIs) or the like. Using interfaces 861, clients 864 may, for example, submit a relationship analysis request with respect to observation records which can be obtained from a specified data source such as a streaming data source 831 or a batched data source 830. In one embodiment, at least some interfaces 861 (such as APIs) may be invoked by an e-book-reader device or e-book reader application. A streaming data source with respect to relationship analysis may include, for example, a growing collection of email or text messages in some embodiments. The data source may be identified, for example, by providing access information such as a network address, a database address, and/or a storage device address. In some implementations an SQL-based programmatic interface may be included in programmatic interfaces 861, enabling clients to submit relationship-related queries (and view results corresponding to such queries) using familiar and easy-to-use interfaces. The raw text data records of a given data set may be pre-processed (e.g., at input record handlers 860 and/or at feature processors 862) before the relationship-detection and graph optimization algorithms are applied, using some of the techniques mentioned earlier such as named entity recognition, n-gram identification and the like.

In their programmatic interactions with the MLS via interfaces 861, clients 864 may indicate a number of preferences or requirements which may be taken into account when implementing the relationship analysis in various embodiments. Examples of such preferences/requirements are discussed below in the context of FIG. 9. Some clients 864 may simply indicate a source of the text to be analyzed, and leave the analysis and reporting decisions to the MLS; other clients, who are more conversant with the statistics involved or who are experts in the subject matter or domain of the observed data, may provide more detailed guidance or preferences with regard to the relationship graph generation/optimization. In some embodiments, a service that supports the sale and/or distribution of electronic books, newspapers, magazines or other publications may act as a client of the machine learning service. That is, the kinds of relationship information displayed on an e-book device discussed in the context of FIG. 6 and FIG. 7 may be generated using the resources of a machine learning service.

The administrative or control plane portion of the MLS may include a request handler 880, which accepts client requests 811, and takes different actions depending on the nature of the analysis requested. For at least some types of requests, the request handler may insert corresponding job objects into batch job queue 842, as indicated by arrow 812. In general, the control plane of the MLS may comprise a plurality of components (including the request handler, the relationship analysis coordinator, a real-time analytics manager, workload distribution strategy selectors, one or more job schedulers, metrics collectors, and modules that act as interfaces with other services), which may also be referred to collectively as the MLS manager. The data plane of the MLS may include, for example, at least a subset of the servers of pool(s) 885, storage devices that are used to store input data, intermediate results or final results (some of which may be part of the MLS artifact repository), and the network pathways used for transferring client input data and results.

A given batch job object may indicate one or more operations that are to be performed as a result of the invocation of a programmatic interface 861, and the scheduling of a given job may in some cases depend upon the successful completion of at least a subset of the operations of an earlier-generated job. In one embodiment, a client may request that relationship analysis be performed on a set of observation records (which were originally generated at a streaming data source) in batch mode (e.g., instead of in real time, or in addition to being performed in real time). In such a scenario, as indicated by arrow 832, some or all of the stream data may be stored at a batched data repository. Each batch-mode analysis may be represented by a corresponding job object in the depicted embodiment. For at least some relationship analysis requests, the original input data may already be available in batch format, and a given job may comprise extracting/optimizing relationship data from a batched data set such as a book's sentences.

In at least some implementations, job queue 842 may be managed as a first-in-first-out (FIFO) queue, with the further constraint that the dependency requirements of a given job must have been met in order for that job to be removed from the queue. In some embodiments, jobs created on behalf of several different clients may be placed in a single queue, while in other embodiments multiple queues may be maintained (e.g., one queue in each data center of the provider network being used, or one queue per MLS customer). Asynchronously with respect to the submission of the requests 811, the next job whose dependency requirements have been met may be removed from job queue 842 in the depicted embodiment, as indicated by arrow 813, and a processing plan comprising a workload distribution strategy may be identified for it. The workload distribution strategy layer 875, which may also be a component of the MLS control plane as mentioned earlier, may determine the manner in which the lower level operations of the job are to be distributed among one or more compute servers (e.g., servers selected from pool 885), and/or the manner in which the data analyzed or manipulated for the job is to be distributed among one or more storage devices or servers. As indicated by arrow 814, the workload distribution strategy layer 875 may also be utilized by relationship analysis coordinator 881 in some embodiments, e.g., to help identify the set of servers to be used for various stages of the analysis. For example, as mentioned earlier, in at least one embodiment relationship extraction for respective partitions of a large data set may be implemented in a parallelized manner. After the processing plan has been generated and the appropriate set of resources to be utilized for the batch job has been identified, operations may be scheduled on the identified resources. Results of some batch jobs or real-time analyses may be stored as MLS artifacts within repository 820 in some embodiments, as indicated by arrow 847.

In the embodiment shown in FIG. 8, clients 864 may be able to view at least a subset of the artifacts stored in repository 820, e.g., by issuing read requests 818. Results 895 of some analyses (such as family tree representations, organization structure representations, or social network representations of the kind discussed earlier) may be made available to clients 864 from server pools 885 via interfaces 861 in some embodiments. Entries may be added to the knowledge base 817 based on input received from clients in the depicted embodiment, and knowledge base entries may also be viewed by the clients in at least some embodiments, as also indicated by arrow 817. Algorithm/model libraries 863 may include a wide variety of machine learning, statistics and data analysis algorithms in addition to the specific relationship-related and text-analysis algorithms discussed above. In at least one embodiment, the MLS may be designed to be extensible—e.g., clients may provide or register their own modules (which may be defined as user-defined functions) for input record handling, feature processing, or for implementing additional machine learning algorithms than are supported natively by the MLS.

It is noted that at least in some embodiments, a machine learning service infrastructure similar to that shown in FIG. 8 may be set up for internal use within a particular organization or business entity—that is, such a service need not be exposed to the public or to entities outside the organization. An e-book device vendor or an e-book application vendor may utilize such a private machine learning service infrastructure for providing the kinds of supplemental information discussed in the context of FIG. 6 and FIG. 7 to millions of customers in some embodiments.

Relationship Analysis Request Parameters

Figure 9:
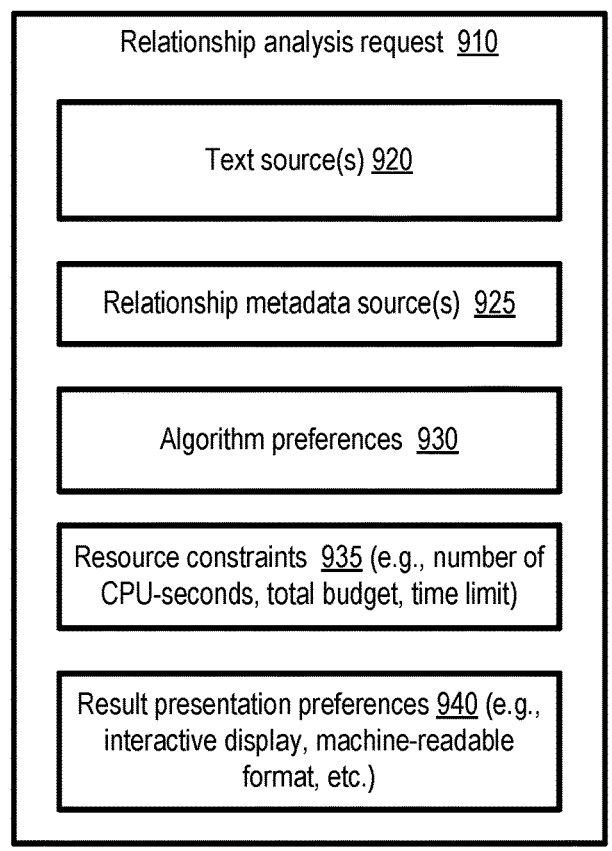
FIG. 9 illustrates example elements of a relationship analysis request which may be transmitted programmatically by a client to a text analyzer, according to at least some embodiments.

FIG. 9 illustrates example elements of a relationship analysis request which may be transmitted programmatically by a client to a text analyzer, according to at least some embodiments. As shown, a relationship analysis request 910 may include an indication of the text source(s) 920, relationship metadata source(s) 925, algorithm preferences 930, resource constraints 935, and/or results presentation preferences 940 in the depicted embodiment. The text and metadata sources may include, for example, a set of files, a library of digitized books or publications, one or more databases, or a network endpoint from which the information may be retrieved by the relationship analyzer when needed. In some embodiments, the algorithm preferences 930 may indicate one or more modeling algorithms or particular variants of algorithms which may work well for the client's data, or a set of algorithm parameters.

In at least some embodiments, a client may be billed based at least in part on the resources consumed for generating the relationship information from their input data. In some such scenarios, a client may indicate resource constraints 935 with respect to the relationship analyzer's operations. The constraints may indicate the maximum amount of resources (e.g., expressed in terms of CPU-minutes or other units which may be used in client billing statements) the analyzer is to use to generate the optimized relationship information, the total budget (expressed in terms of a currency) available for predicting and optimizing the relationships, and/or the maximum time to be taken to produce the results. The relationship analyzer may make decisions, such as the selection of the maximum size of the cycles to be identified in relationship graphs, the number of training/testing iterations, or the number of execution platforms on which analysis operations are to be performed in parallel, based on the client's resource constraints 935 indicated in the request 910.

Result presentation preferences 940 may indicate, for example, the manner in which the outputs produced by the relationship analyzer are to be provided to specified destinations. Some clients may simply want to view the results via an interactive interface (e.g., a web-based console) which allows clients to zoom in and out to examine various aspects of the relationships in detail, while other clients may prefer the relation representations to be generated in a machine-readable format which can be provided as input to other automated systems.

Not all the elements shown in FIG. 9 may be included in client-submitted relationship analysis requests in some embodiments—for example, the relationship analyzer or service may be responsible for selecting the algorithms and parameters in at least some embodiments. It may sometimes be the case that some of the client preferences may be contradictory with respect to other preferences. For example, the client's resource constraints may not always be compatible with the size of the data set and the algorithms to be used. In some embodiments, a relationship analyzer may be able to indicate that particular combinations of preferences cannot be satisfied, and may suggest to the client that some preferences be modified or overridden by values selected by the analyzer.

Use Cases

The techniques described above, of automatically extracting relationship information from potentially large sets of text data and resolving inconsistencies in the relationships, may be extremely useful in a number of scenarios. Analyzing the contents of books, magazines, newspaper articles and the like to identify relationships between individuals or characters may enable the providers of such content to enhance the experience of their customers, and thereby increase customer satisfaction. Recruiters may use relationship analyzers on resume databases or business-related social media sites to identify potential inconsistencies in resumes. Organizations providing social media tools may utilize the techniques to, for example, prune suggestions (e.g., suggestions to establish links with others) that may have a high probability of rejection by their customers. Using clusters of execution platforms (e.g., of a machine learning service) in parallel, consistent relationship information may be extracted from very large data sets in a scalable manner.

Illustrative Computer System

Figure 10:
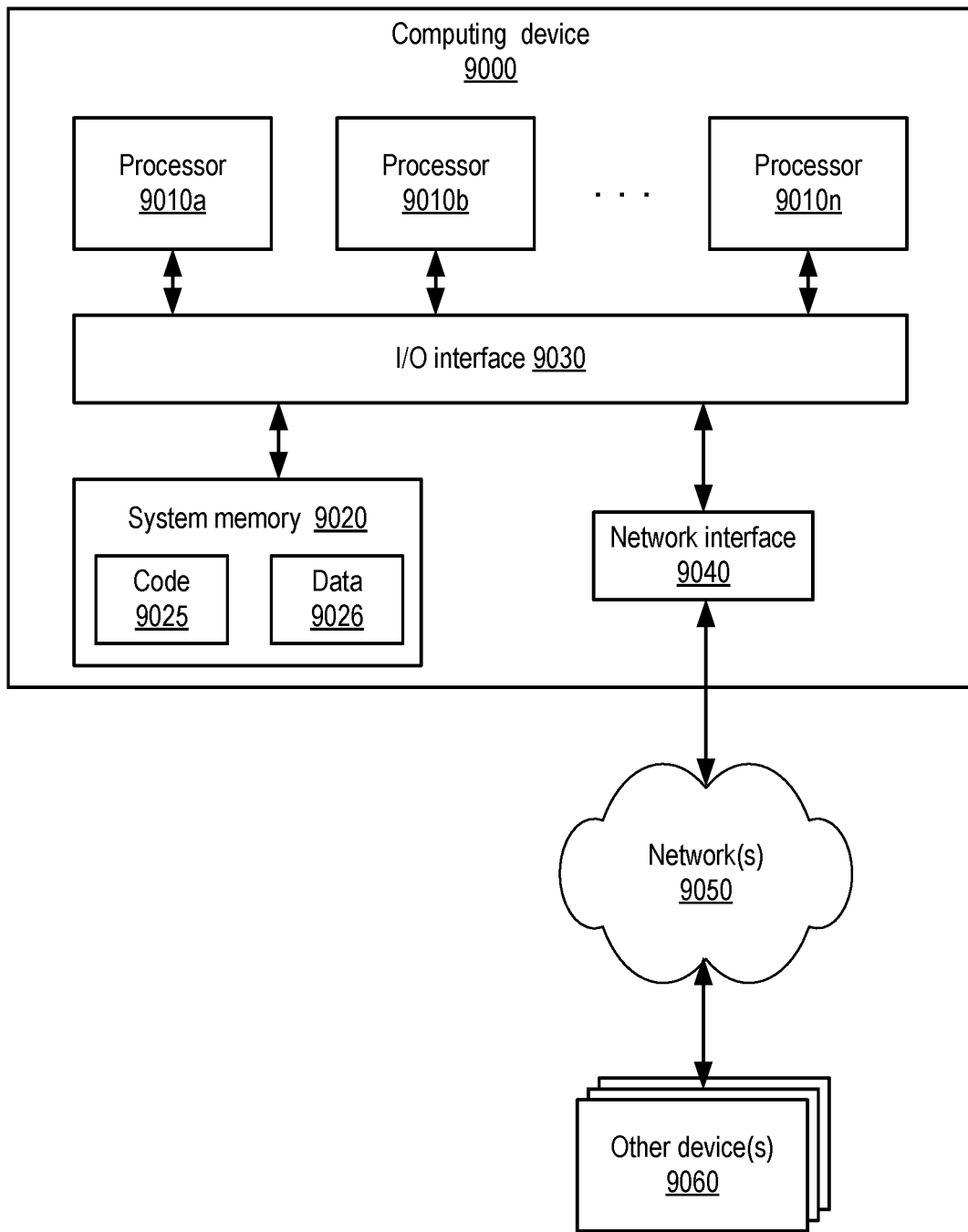
FIG. 10 is a block diagram illustrating an example computing device that may be used in at least some embodiments.

In at least some embodiments, a server that implements a portion or all of one or more of the technologies described herein, including the relationship graph extraction and optimization techniques, as well as various components of a machine learning service may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more computing devices of a network-accessible text analysis service;
   wherein the one or more computing devices are configured to:
   determine that relationship analysis is to performed on a data set comprising a plurality of text collections, wherein a particular text collection of the plurality of text collections includes (a) one or more tokens indicating a respective named entity and (b) one or more indicators of a respective relationship between one named entity and another named entity;
   generate, using the data set, a first graph comprising a plurality of nodes and a plurality of edges, wherein an individual node corresponds to a named entity identified from the plurality of text collections, wherein an individual edge indicates a relationship between a pair of named entities corresponding to a pair of nodes of the first graph linked by the edge, and wherein individual edges of the plurality of edges of the first graph, including a first edge, have a respective weight indicative of a confidence level associated with the relationship between the respective pair of named entities corresponding to the respective pair of nodes of the first graph linked by the respective edge;
   designate, based at least in part on a consistency rule set, at least a first cycle of the first graph as an inconsistent cycle, wherein the first cycle includes the first edge and a second edge;
   prune one or more edges, including the first edge, from the first graph to obtain a second graph, wherein the first edge is selected for pruning from the first graph based at least in part on inclusion of the first edge in the first cycle that was designated as the inconsistent cycle, and on the weight of the first edge indicative of the confidence level associated with the relationship between the pair of named entities corresponding to the pair of nodes of the first graph linked by the first edge; and
   provide, via a programmatic interface, a representation of one or more relationships indicated in the second graph, including a particular relationship corresponding to the second edge.

2. The system as recited in claim 1, wherein individual ones of the text collections comprise respective sentences in an e-book, wherein the one or more computing devices are configured to:
   receive an indication via another programmatic interface that a reader of the e-book has (a) read a particular section of the e-book and (b) has requested supplementary information about the e-book; and
   provide the representation of one or more relationships as part of the supplementary information.

3. The system as recited in claim 1, wherein the one or more computing devices are configured to:
   select the first edge for pruning using one or more of: (a) a belief propagation algorithm (b) a greedy edge retention algorithm.

4. The system as recited in claim 1, wherein the one or more computing devices are configured to:
   receive, via the programmatic interface, a request from a client to analyze the data set, wherein the request indicates a source of the data set.

5. The system as recited in claim 1, wherein the one or more computing devices are configured to:
   determine, using one or more of: (a) a multi-class logistic regression model, (b) a binary logic regression model, or (c) a neural network model, that a first text collection of the plurality of text collections indicates a first relationship with a first probability; and
   compute the weight of the first edge based at least in part on the first probability.

6. A method, comprising:
   performing, by one or more computing devices:
   generating, using a data set comprising a plurality of text collections, a first graph comprising a plurality of nodes and a plurality of edges, wherein an individual node corresponds to a named entity identified from the data set, wherein an individual edge indicates a relationship between a pair of named entities corresponding to a pair of nodes of the first graph linked by the edge, and wherein individual edges of the plurality of edges of the first graph, including a first edge, have a respective weight indicative of a confidence level associated with the relationship between the respective pair of named entities corresponding to the respective pair of nodes of the first graph linked by the respective edge;
   designating, based at least in part on a consistency rule set, at least a first cycle of the first graph as an inconsistent cycle, wherein the first cycle includes the first edge;
   pruning one or more edges, including the first edge, from the first graph to obtain a second graph, wherein the first edge is selected for pruning from the first graph based at least in part on inclusion of the first edge in the first cycle that was designated as the inconsistent cycle, and on the weight of the first edge indicative of the confidence level associated with the relationship between the pair of named entities corresponding to the pair of nodes of the first graph linked by the first edge; and
   providing, via a programmatic interface, a representation of one or more relationships indicated in the second graph.

7. The method as recited in claim 6, wherein individual ones of the text collections comprise respective sentences in an e-book, further comprising:
   receiving, at the one or more computing devices, an indication via a programmatic interface that a reader of the e-book has (a) read a particular section of the e-book and (b) has requested supplementary information about the e-book; and providing, by the one or more computing devices, the representation of one or more relationships as part of the supplementary information.

8. The method as recited in claim 7, further comprising:
determining, at the one or more computing devices, that the reader of the e-book has read an additional section of the e-book; and providing, by the one or more computing devices, a second representation of relationships indicated in the e-book, wherein the second representation indicates a particular relationship determined from an analysis of the additional section of the e-book, and wherein the particular relationship is not included in the supplementary information provided to the reader before the second section was read by the reader.

9. The method as recited in claim 6, wherein selecting the first edge for pruning comprises executing one or more of: (a) a belief propagation algorithm (b) a greedy edge retention algorithm.

10. The method as recited in claim 6, further comprising performing, by the one or more computing devices:
receiving, via a programmatic interface, a request from a client to analyze the data set, wherein the request indicates a source of the data set.

11. The method as recited in claim 6, further comprising performing, by the one or more computing devices:
receiving, via a programmatic interface, respective indicators to be used to detect individual ones of a plurality of relationship categories in the data set.

12. The method as recited in claim 6, further comprising performing, by the one or more computing devices:
receiving, via a programmatic interface, the consistency rule set.

13. The method as recited in claim 6, wherein the first edge is selected for pruning based at least in part on an edge retention tradeoff parameter indicative of a relative priority assigned to edge weights with respect to inconsistency.

14. The method as recited in claim 6, wherein said generating the first graph comprises:
identifying a set of relationship categories to be used to analyze the data set;
determining that a first text collection of the data set indicates, with a first probability, at least a first relationship between a pair of named entities, wherein the first relationship belongs to a first category of the set of relationship categories;
determining that a different text collection of the data set indicates, with a second probability, the first relationship between the pair of named entities; and
assigning a weight, based at least in part on the first and second probabilities, to a particular edge in the first graph, wherein the particular edge represents the first relationship.

15. The method as recited in claim 14, wherein determining that the first text collection indicates the first relationship with the first probability comprises:
determining, based on analysis of the first text collection, a third probability of an undirected relationship between the pair of named entities;
determining, based on additional analysis of the first text collection, a fourth probability of a direction of the relationship between the pair of named entities; and
computing the first probability based at least in part on the third and fourth probabilities.

16. The method as recited in claim 6, further comprising performing, by the one or more computing devices:
obtaining, prior to generating the first graph, at least some text collections of the plurality of text collections from audio corresponding to a video.

17. A non-transitory computer-accessible storage medium storing program instructions that when executed on one or more processors:
generate, using a data set comprising a plurality of text collections, a first graph comprising a plurality of nodes and a plurality of edges, wherein an individual node corresponds to a named entity identified from the data set, wherein an individual edge indicates a relationship between a pair of named entities corresponding to a pair of nodes of the first graph linked by the edge, and wherein individual edges of the plurality of edges of the first graph, including a first edge, have a respective weight indicative of a confidence level associated with the relationship between the respective pair of named entities corresponding to the respective pair of nodes of the first graph linked by the respective edge;
designate, based at least in part on a consistency rule set, at least a first cycle of the first graph as an inconsistent cycle, wherein the first cycle includes the first edge;
delete one or more edges, including the first edge, from the first graph to obtain a second graph, wherein the first edge is selected for deletion from the first graph based at least in part on inclusion of the first edge in the first cycle that was designated as the inconsistent cycle, and on the weight of the first edge indicative of the confidence level associated with the relationship between the pair of named entities corresponding to the pair of nodes of the first graph linked by the first edge; and
provide, via a programmatic interface, a representation of one or more relationships indicated in the second graph.

18. The non-transitory computer-accessible storage medium as recited in claim 17, wherein individual ones of the text collections comprise respective sentences in an e-book, wherein the instructions when executed on the one or more processors:
determine that a reader of the e-book has (a) read a particular section of the e-book and (b) has requested supplementary information about the e-book; and
include the representation of one or more relationships as part of the supplementary information.

19. The non-transitory computer-accessible storage medium as recited in claim 17, wherein the instructions when executed on the one or more processors:
select the first edge for deletion using one or more of: (a) a belief propagation algorithm (b) a greedy edge retention algorithm.

20. The non-transitory computer-accessible storage medium as recited in claim 17, wherein the instructions when executed on the one or more processors:
determine that a request from a client to analyze the data set has been received via a programmatic interface, wherein the request indicates a source of the data set.

21. The non-transitory computer-accessible storage medium as recited in claim 17, wherein the instructions when executed on the one or more processors:
determine, using one or more of: (a) a multi-class logistic regression model, (b) a binary logic regression model, or (c) a neural network model, that a first text collection of the plurality of text collections indicates a first relationship with a first probability; and compute the weight of the first edge based at least in part on the first probability.

\* \* \* \* \*